United States Patent [19]

Elliott

[11] Patent Number: 4,786,035
[45] Date of Patent: Nov. 22, 1988

[54] AIRSPRING WITH INTERNAL RESTRAINT

[75] Inventor: Robert F. Elliott, Westfield, Ind.

[73] Assignee: The Firestone Tire & Rubber Company, Akron, Ohio

[21] Appl. No.: 933,423

[22] Filed: Nov. 21, 1986

[51] Int. Cl.[4] .............................. F16F 5/00; F16F 9/04
[52] U.S. Cl. .................................. 267/122; 267/64.11; 267/64.27
[58] Field of Search .................... 267/74, 64.19, 64.21, 267/64.23, 64.24, 64.27, 122, 153; 74/18.2

[56] References Cited

U.S. PATENT DOCUMENTS

| 1,182,324 | 5/1916 | Schneider | 267/74 |
|---|---|---|---|
| 1,531,672 | 3/1925 | McLean | 267/74 |
| 1,636,386 | 7/1927 | Oberreich | 267/9 |
| 2,877,010 | 3/1959 | Gouirand | 267/15 |
| 3,001,610 | 9/1961 | Takagi | 267/8 |
| 3,664,653 | 5/1972 | Walker | 267/139 |
| 4,029,305 | 6/1977 | Schubert | 267/65 |
| 4,573,842 | 3/1986 | Mantela et al. | 267/153 X |

FOREIGN PATENT DOCUMENTS 1146764 4/1963 Fed. Rep. of Germany ... 267/64.27

Primary Examiner—Andres Kashnikow
Assistant Examiner—Richard Potosnak
Attorney, Agent, or Firm—Ronald Brietkrenz

[57] ABSTRACT

An airspring for motor vehicles which includes a pair of spaced end members with an intervening flexible elastomeric sleeve forming a fluid pressure chamber therebetween, for absorbing shock forces exerted on the vehicle caused by variations in the surface of the roadway. An elongated flexible strap of synthetic fabric such as nylon, is formed as a closed loop and is connected to and extends between the end members within the pressure chamber. The flexible strap limits the expansion of the flexible sleeve in an extended direction to prevent damage to the airspring without effecting the external configuration of the airspring and without materially effecting movement of the airspring in the jounce direction.

7 Claims, 3 Drawing Sheets

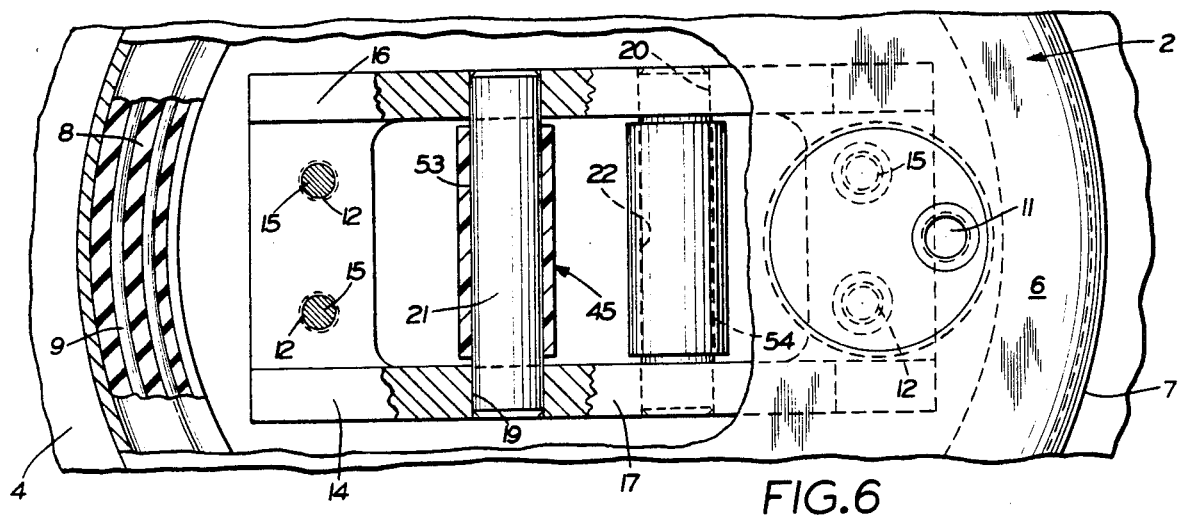
FIG.6
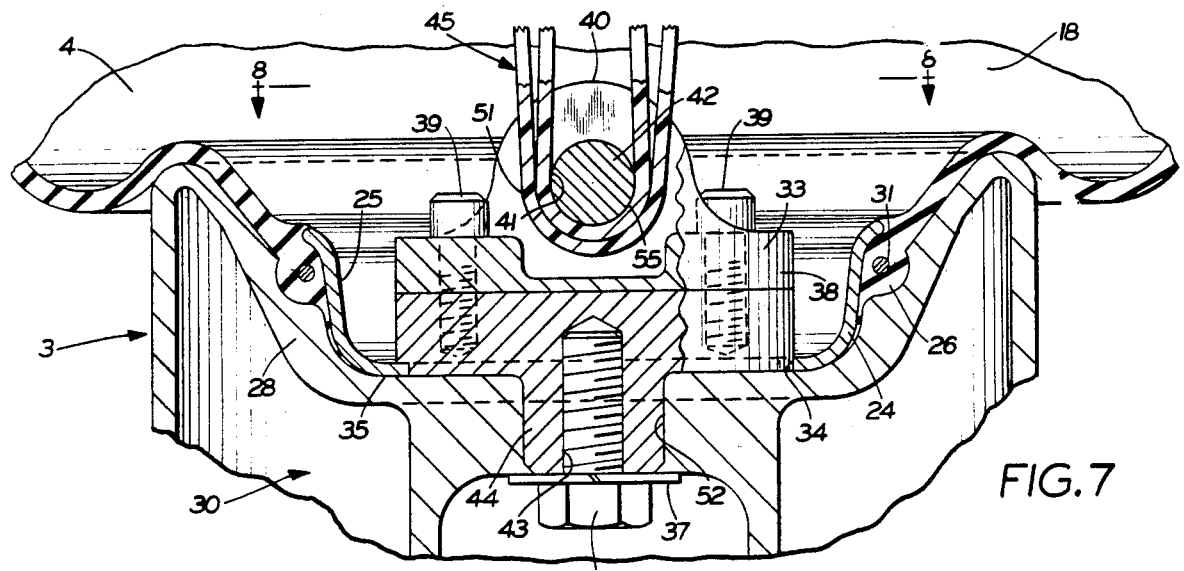
FIG.7
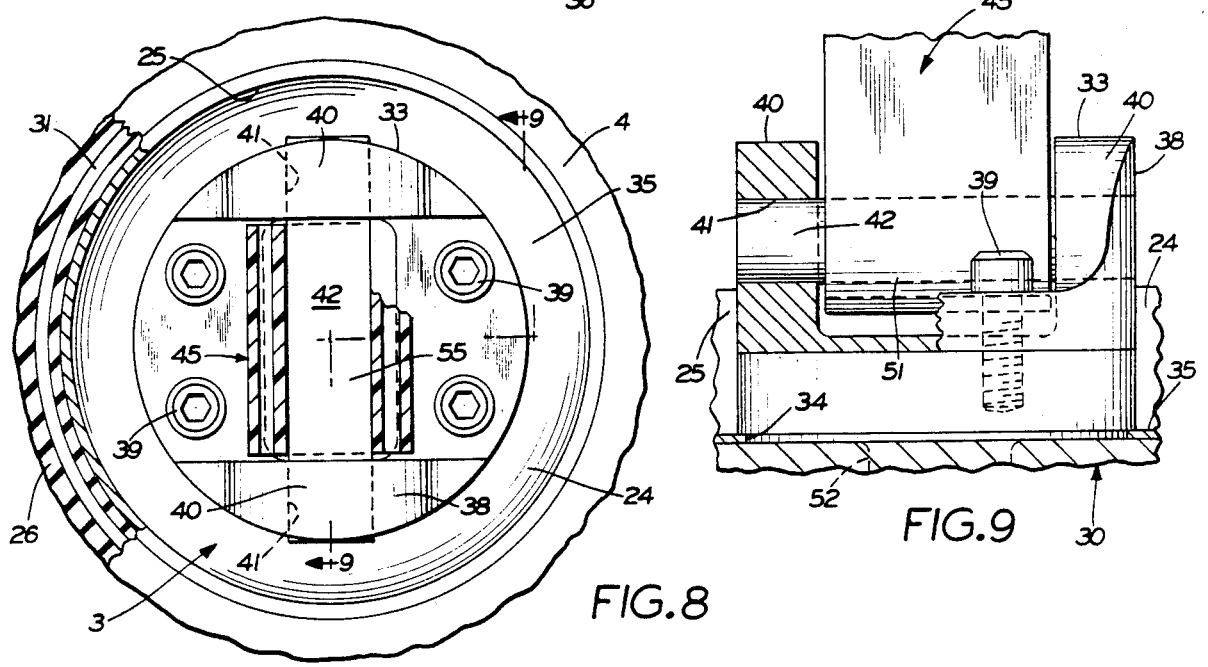
FIG.8
FIG.9

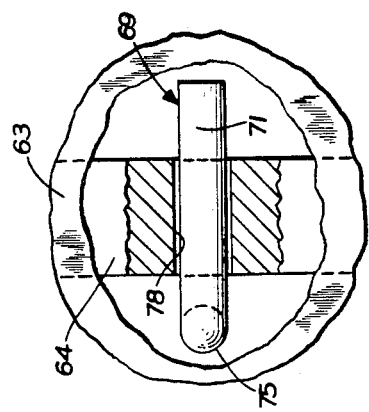
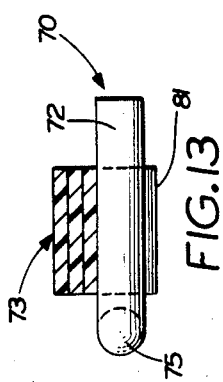
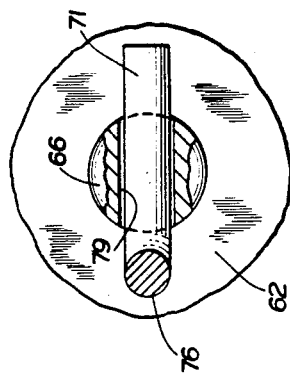
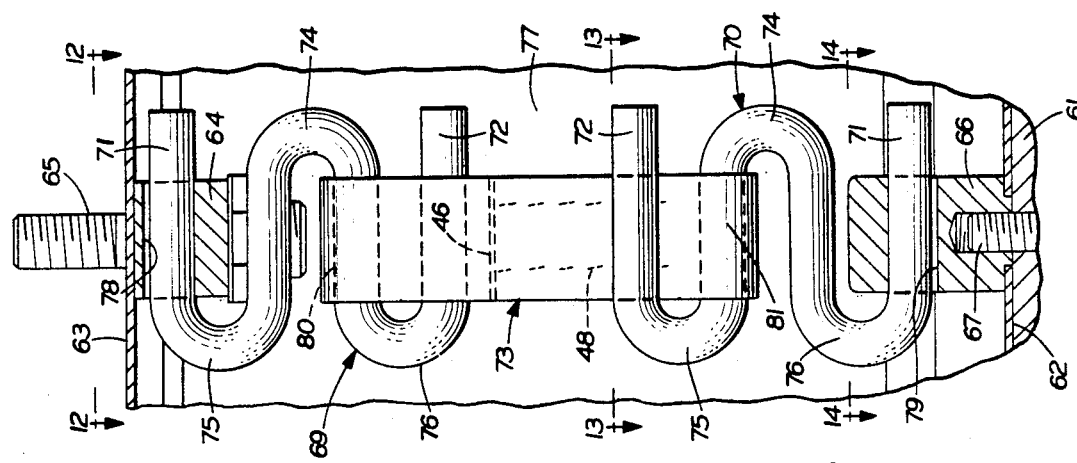
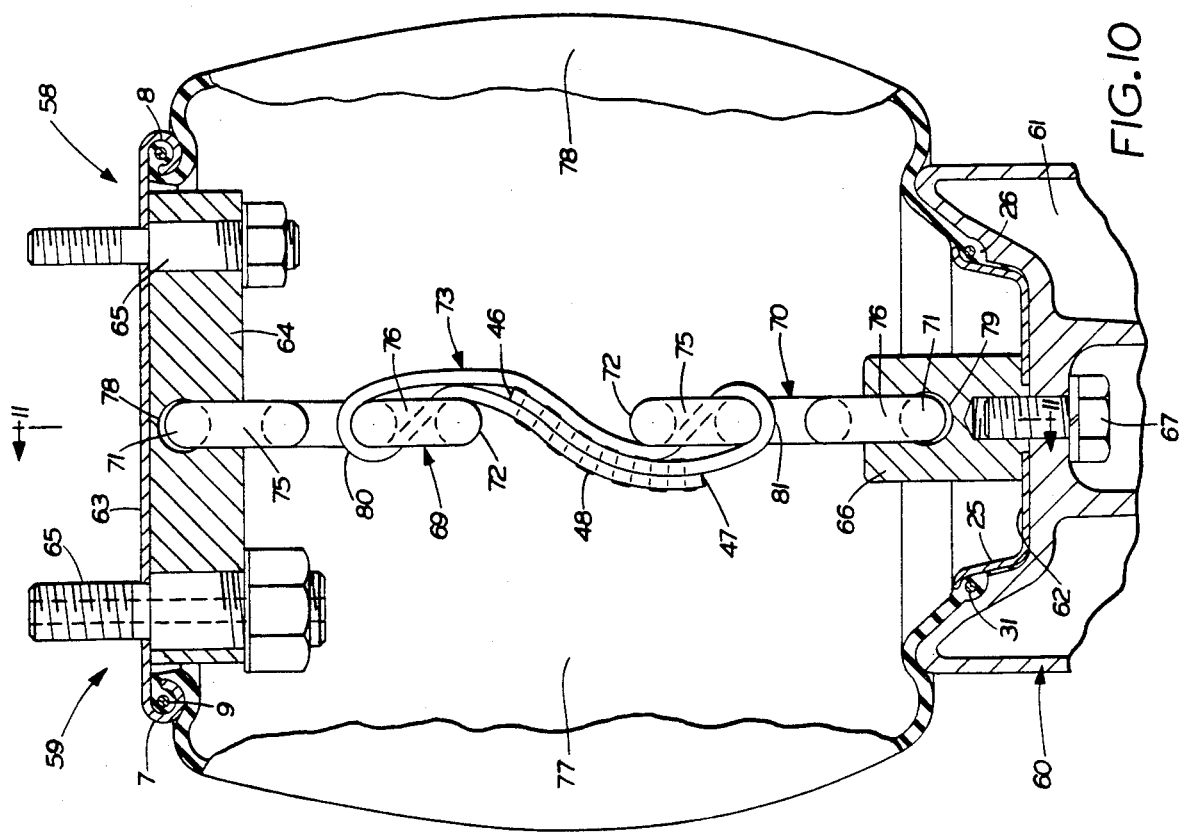

AIRSPRING WITH INTERNAL RESTRAINT

TECHNICAL FIELD

The invention relates to vehicle suspensions and particularly to an airspring having an internal restraint to restrict the extension of the spring in the extended position without effecting the rebound or jounce action thereof.

BACKGROUND ART

Pneumatic springs, commonly referred to as airsprings, have been used with motor vehicles for a number of years to provide cushioning between movable parts of the vehicle primarily to absorb shock loads impressed on the vehicle axle by the wheels striking an object in the road or entering into a depression. These airsprings usually consist of a flexible rubber sleeve or bellows containing a supply of compressed air and having one or more pistons located within the flexible resilient sleeve to cause compression and expansion of the air as the vehicle experiences the road shock. The pistons cause compression and expansion of the fluid within the spring sleeve with the sleeve being of a flexible material permitting the pistons to move axial with respect to each other as the sleeve moves from an extended to a retracted or compressed condition. The flexible sleeves are bellow-shaped or have rolled ends to permit the sleeve to move axially between the jounced or collapsed position in a rebound or expended position without damaging the flexible sleeve in which the pistons are located.

However, should the vehicle wheel experience a severe shock the airspring could extend an excessive amount rupturing the air sleeve requiring replacement and repair of the airspring. To prevent such over extension of the sleeve external restraints are used on many airsprings. These external restraints require separate metal attachments on the vehicle and airspring to limit the extension of the sleeve. Although these external restraints have generally proved effective, they increase the cost of the airspring installation and increase maintenance and repair thereon. Furthermore, these metal parts due to their location on the underside of the vehicle, are subject to the usual corrosion and rust due to the harsh environment to which they are exposed.

No known airspring is being used today which utilizes an internal restraint formed of a flexible non metallic strap material.

U.S. Pat. No. 1,636,386 shows a cushion rebound check strap which extends between an axle of a vehicle and another part thereof to limit the movement of the axle in combination with a leaf spring.

U.S. Pat. No. 2,877,010 shows the mounting of a cable within an elastomer tubular pneumatic member, one end of the cable being fixed to an end member and the other cable end being attached to the valve at the other end of the flexible sleeve to permit the introduction of additional air if the sleeve becomes elongated when overloaded.

U.S. Pat. No. 3,001,610 discloses an oil damper having a chain inside of an auxillary piston to limit the lift thereof.

U.S. Pat. No. 3,664,653 shows a shock absorber consisting of a plurality of pneumatic tires connected together by an internal cable.

U.S. Pat. No. 4,029,305 shows the use of external metal cables in combination with airsprings.

Internal metal cables or other similar internal restraints present a problem if mounted within an airspring since the cable is subject to rust and corrosion and ultimate breakage. Also the metal will rub against the inside of the flexible sleeve possibly resulting in a leak developing in the sleeve wall. Also, the metal will not provide any elongation or stretch to assist in absorbing a load when placed thereon which is desirable to avoid a sudden shock to the vehicle and airspring.

Thus the need has existed for an improved airspring having an internal restraint formed of a nonmetallic member completely eliminating the need for any external restraint means.

DISCLOSURE OF THE INVENTION

Objectives of the invention include providing an improved airspring construction having an internal restraint in the form of a flexible elongated strap of water resistant material, preferably nylon, which eliminates external restrictions being required on the vehicle and airspring, which reduces safety hazards due to over-extension of the airspring, and which reduces the cost of replacing damaged over-extended assemblies and the cost of the heretofore required external restraint devices.

Another object of the invention is to provide such an improved airspring which is assembled at the factory and thereafter eliminates any additional cost of adding external restraints by the ultimate user of the airspring, and which will eliminate or materially reduce any maintenance on behalf of the user or subsequent replacement thereof due to over-extension.

Another objective of the invention is to provide such an improved airspring which enables the length of stroke of the airspring to be controlled for various applications in an extremely simple and effective manner by regulating the length of the internal flexible strap, and which will not interfere with the collapsed or jounce movement of the airspring nor interfere with the operation of the airspring, and which can easily supply a sufficient restraint force beyond that of the burst pressure of the airspring itself. Still another objective is to provide such an airspring in which the internal restraint strap may be looped about curved surfaces within the flexible sleeve preventing any rigid clamping of the strap which weakens the strap, in which the strap is moisture resistant and tolerant to rubbing against the inside of the elastomeric sleeve, and in which the strap can be formed of readily available inexpensive material and spliced together to form the desired length of internal restraint preferably in a looped form.

These objectives and advantages are obtained by the improved airspring construction of the invention, the general nature of which may be stated as including a pair of spaced end members adapted to be mounted in a spaced relationship on a vehicle and movable towards and away from each other between jounce and extended positions upon a wheel of the vehicle encountering variations in a road surface; a fluid pressure chamber formed between the end members by a flexible sleeve sealingly connected at opposite ends thereof to said end members for absorbing shock loads on the vehicle wheel; and a strap of flexible synthetic material operatively connected to and extending between the end members within the fluid pressure chamber to limit the movement of said end members away from each other.

BRIEF DESCRIPTION OF THE DRAWINGS

Preferred embodiments of the invention, illustrative of the best modes in which applicant has contemplated applying the principles, are set forth in the following description and are shown in the drawings, and are particularly and distinctly pointed out and set forth in the appended claims.

FIG. 6 is an enlarged fragmentary view with portions broken away and in section, looking in the direction of arrows 6—6, FIG. 3;

FIG. 7 is an enlarged fragmentary sectional view taken on line 7—7, FIG. 4, showing the lower portion of the restraint strip connected to the end closure of the lower end member;

FIG. 8 is a fragmentary sectional view taken on line 8—8, FIG. 7, with portions broken away and in section;

FIG. 9 is a fragmentary sectional view taken on line 9—9, FIG. 8;

FIG. 10 is a fragmentary view with portions broken away and in section, similar to FIG. 3, showing a modified form of the improved airspring construction, FIG. 11 is a fragmentary sectional view taken on line 11—11, FIG. 10;

FIG. 12 is a fragmentary sectional view with portions broken away, looking in the direction of arrows 12—12, FIG. 11;

FIG. 13 is a fragmentary sectional view taken on line 13—13, FIG. 11; and

FIG. 14 is a fragmentary sectional view taken on line 14—14, FIG. 11.

Similar numerals refer to similar parts throughout the drawings.

BEST MODE FOR CARRYING OUT THE INVENTION

Figure 2:
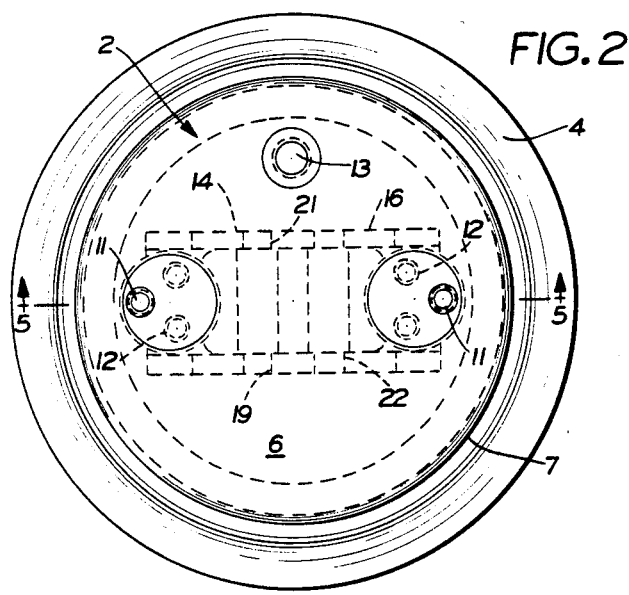
FIG. 2 is an enlarged top plan view of the airspring of FIG. 1.
Figure 1:
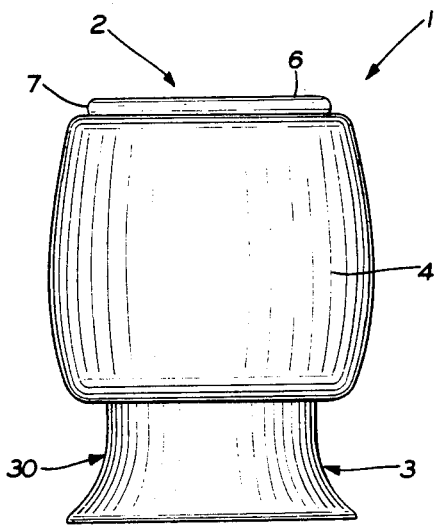
FIG. 1 is an elevational view of the improved airspring containing the internal restraint.

The improved airspring is indicated generally at 1 and is shown in FIG. 1. Airspring 1 consists of a pair of spaced end members, indicated generally at 2 and 3, which are sealingly connected to opposite ends of an intervening flexible elastomeric sleeve 4. Upper end member 2 (FIGS. 2, 5 and 6) includes an internal disc-shaped bead plate 6 having an annular rolled end 7 which is crimped about bead 8 of flexible sleeve 4 to provide an airtight sealing engagement for the sleeve. An internal reinforcing band 9 may be molded within sleeve bead 8 if desired, to provide additional strength to increase the sealing effect with rolled end 7.

Figure 5:
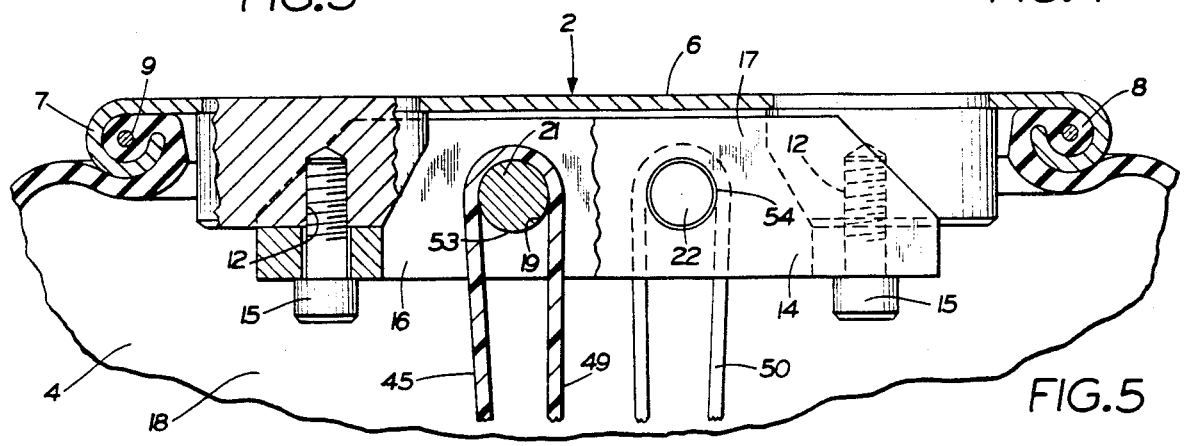
FIG. 5 is an enlarged fragmentary sectional view taken on line 5—5, FIG. 2.

Bead plate 6 may be formed with a plurality of threaded top openings 11 which extend partially into the plate for mounting airspring 1 on a vehicle. Internally threaded holes 12 are also formed in plate 6 for mounting an internal restaint beam 14 thereto by bolts 15 (FIG. 5).

Internal restraint beam 14 has a generally rectangular configuration and has a pair of side frame members 16 and 17 providing a clevis configuration, with two pairs of aligned openings 19 and 20 being formed therein. Dowel pins 21 and 22 preferably formed of stainless steel, are press fitted into opening pairs 19 and 20, respectively. An air inlet hole 13 also may be formed in bead plate 6 (FIG. 2) for introducing air into pressured air chamber 18 formed by hollow sleeve 4.

Lower end member 3 includes an end enclosure 24 (FIG. 7) having an annular sidewall 25 which sealingly compresses bead 26 of the lower end of sleeve 4 against a complementary shaped conical wall 28 of a lower end piston indicated generally at 30. A reinforcing band 31 also may be molded within bead 26 to provide additional strength and sealing with sidewall 25. Piston 30 may be made of aluminum, steel, plastic or hard rubber and i secured to end closure 24 by a bolt 36 and washer 37. Bolt 36 is engaged in a threaded hole 43 formed in a boss 44 extending downwardly from a clevis mounting block 33.

Mounting block 33 (FIG. 7) is mounted on and extends through an annular opening 34 formed in bottom wall 35 of end closure 24 with boss 44 extending through an opening 52 formed in the center of piston 30. A clevis 38 is secured by a plurality of bolts 39 to mounting block 33 and includes a pair of upstanding posts 40 having a pair of aligned holes 41 formed therein in which a dowel rod 42 is press fitted. Dowel rod 42 preferably is formed of stainless steel similar to dowel rods 21 and 22 of upper end member 2.

Thus end members 2 and 3, and in particular bead plate 6 and lower end closure 24 provide an airtight clamping, sealing engagement with bead ends 8 and 26 of sleeve 4 to provide fluid pressure chamber 18 within sleeve 4 (FIGS. 3 and 4) in which a supply of air or other gas is maintained and is compressed upon contraction or movement of the airspring to a jounce position, and which pressurized fluid maintains the airspring in its expanded normal position.

In accordance with the invention, a flexible strap, indicated generally at 45, is formed into a loop and extends about dowel rods 21, 22 and 42. Flexible strap 45 preferably is formed of a weather resistant, high strength nylon, preferably having a rating of 20,000 psi. A paritcular type of nylon material found suitable for strap 45 is manufactured by Indiana Mills, Inc. of Carmelle, Indiana under its catalogue number 10494. Strap ends 46 and 47 are overlapped and sewn together with a high strength industrial thread 48, preferably having generally the same elongation factor as that of strap 45, to provide a strong and lasting splice and to form the strap into a closed continuous loop.

In the particular embodiment shown in FIGS. 1-9, strap 45 is formed into double looped ends 49 and 50 through which dowel rods 21 and 22 extend respectively, and with the intermediate portion of the strap, indicated at 51, being double thickness and looped about dowel rod 42. Dowel rods 21, 22, and 42 are cylindrically shaped having smooth outer surfaces 53, 54 and 55, respectively, enabling strap 45 to be looped thereabout and engaged with the rods without any cutting action or adverse effect being applied to the strap. This looped mounting arrangement reduces the stress on the strap which would occur if the straps were clamped by some rigid plate or other connection within the sleeve. This construction also permits the straps to move slightly on the dowel rods due to movement of the upper and lower end members without effecting the mounting of the strap within chamber 18.

A modified form of the improved airspring is indicated generally at 58, and is shown in FIGS. 10-14. Airspring 58 includes upper and lower end members, indicated generally at 59 and 60, respectively. Lower end member 60 includes a piston 61 and an end closure 62 similar to piston 30 and end closure 24 of airspring 1 described above. Upper end member 59 includes an end closure or bead plate 63 and an attachment block 64. Block 64 has a plurality of bolts 65 press fitted therein for mounting airspring 58 onto a vehicle. Another attachment block 66 is secured by a bolt 67 to piston 61 and to end enclosure 62 at lower end member 60. Attachment blocks 64 and 66 are both located within pressure chamber 77 formed within a flexible sleeve 68 similar to sleeve 4.

A pair of double S-shaped hooks indicated generally at 69 and 70, are pivotally mounted in attachment blocks 64 and 66. Each hook 69 and 70 includes a pair of spaced parallel ends 71 and 72 which extend transverse to a flexible strap indicated at 73, which is similar to strap 45 described above. Hooks ends 71 and 72 are integrally joined by intermediate U-shaped portions 74 and a pair of curved U-shaped junction portions 75 and 76.

Strap 73 includes a pair of ends overlapped and sewn together to form a closed loop configuration as in strap 45. Hook ends 71 are loosely mounted in attachment blocks 64 and 66 by extending through holes 78 and 79 formed therein respectively. Strap 73 when mounted on hooks 69 and 70 is flattened (FIG. 10) to provide a pair of looped ends 80 and 81 through which a leg of each of the U-shaped intermediate portions 74 extends. The adjacent portions of the flattened strap extend about parallel ends 72 of the S-shaped hooks as shown in FIGS. 10 and 11. Again, the rounded configuration of the various components of the S-shaped hooks provide smooth curved surfaces with which strap 73 is engaged to prevent cutting or crimping of the strap during the constant movement of end members 59 and 60 axially with respect to each other upon the vehicle experiencing road variations.

The particular configurations of the end members of airsprings 1 and 58 as shown in the drawing may vary without effecting the concept of the invention. The main features achieved by these various end members is providing an airtight seal with the flexible elastomeric sleeves and providing a means for mounting the airspring to a vehicle, and for providing an internal attachment point for the flexible strap.

Figure 3:
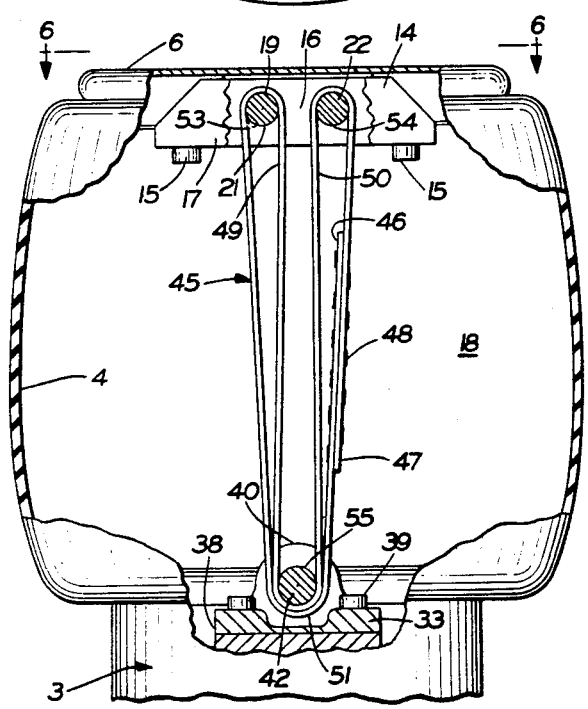
FIG. 3 is an enlarged fragmentary view with portions broken away and in section, of the improved airspring showing the internal restraint flexible fabric strip.
Figure 4:
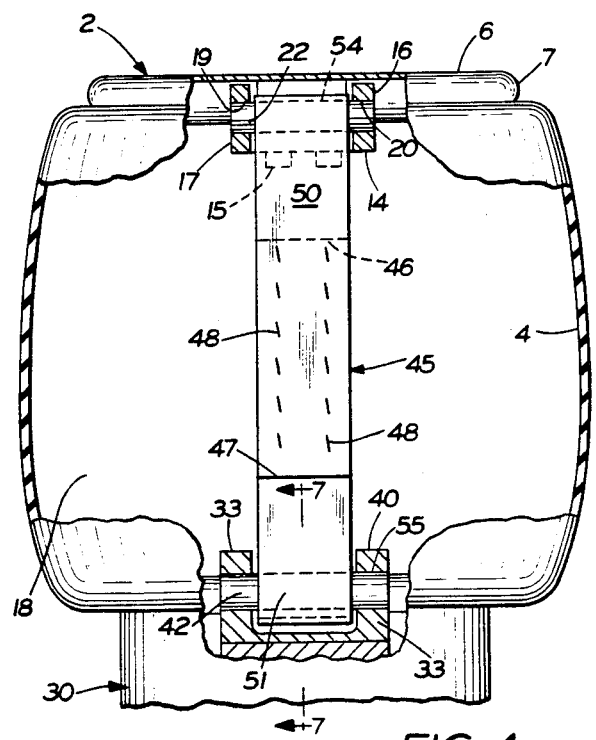
FIG. 4 is a view similar to FIG. 3 oriented 90° from that of FIG. 3.

Thus as can be seen from the drawings and described above, flexible straps 45 and 73 are mounted within the fluid chambers formed by flexible elastomeric sleeves 4 and 68, and will maintain the airsprings in their normal at-rest expanded position as shown in FIGS. 3, 4, and 10. The straps will permit the sleeves to collapse as the end members move axially towards each other in a jounce position without interfering with the collapse of the flexible sleeves or the operation thereof. Also the straps will not interfere with the movement of the pistons for the airsprings. Another important feature of the invention is that the straps being formed by a flexible fabric will have a slight amount of stretch thereto in contrast to a chain cable or metal component. This will provide some "give" and shock absorbing effect upon the airspring abruptly reaching its fully extended position to assist in absorbing the shock placed thereon, and most importantly will prevent rupture of the elastomeric sleeve by its tearing away from the end mounting members which would occur if no external restraint devices were used or without the internal restraint straps.

Furthermore, straps 45 and 73 are free to move slightly on their mounting dowel rods which will reduce the formation of a stress point on the straps. Also the straps are not materially effected by their engagement with the mounting rods due to the smooth surfaces of the rods in contrast to the strap being clamped within the flexible sleeve. The looped ends of the strap permit this desired result to be achieved. Likewise, the internal restraint straps do not effect the external configuration and size of the airsprings nor do they require the ultimate user thereof to make any vehicle mounting modifications. Once the straps are installed within the airspring at the factory, no further operations should be required thereon throughout the life of the airsprings.

Accordingly, the improved airspring construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved airspring having the internal restraint is constructed and used, the characteristics of the improved construction, and the advantageous, new and useful results obtained; the new and useful structures, devices, elements, arrangements, parts, and combinations, are set forth in the appended claims.

What is claimed is:

1. An improved airspring construction including:
   (a) a pair of spaced end members adapted to be mounted in a spaced relationship on a vehicle and movable towards and away from each other between jounce and extended positions upon a wheel of the vehicle encountering variations in a rod surface;
   (b) a fluid pressure chamber formed between the end members by a flexible sleeve sealingly connected at opposite ends thereof to said end members for absorbing shock loads on the vehicle wheels;
   (c) a pair of strap mounting brackets mounted on one of the end members and a single strap mounting bracket mounted on the other of said end members each of the strap mounting brackets includes a clevis and a cylindrical rod which is fixedly now rotatably mounted on each of said clevises; and
   (d) a continuous strap of flexible high strength, water resistant material operatively connected to and extending between the end members within the fluid pressure chamber to limit the movement of said end members away from each other, said strap having an intermediate portion looped about the said one mounting bracket and forms a pair of looped ends opposite of said one mounting bracket with the rods of each of the said pair of mounting brackets directly engaging a respective one of the formed looped ends for mounting said strap on the end members.

2. The airspring construction defined in claim 1 in which the strap has a rating of 20,000 psi..

3. The airspring construction defined in claim 1 in which each of the end members includes an end closure; in which the ends of the flexible sleeve are sealingly clamped against the end closure to provide the generally airtight fluid pressure chamber therebetween; and in which the clevises are mounted on respective ones of the end closures.

4. The airspring construction defined in claim 1 in which the flexible strap is an elongated flat strip of material formed into a continuous loop by a single splice.

5. The airspring construction defined in claim 4 in which the strap has two ends; and in which the strap ends are overlapped and sewn together to form the splice with a high strength thread having generally the same elongation factor as the strap material.

6. An improved airspring construction including:
(a) a pair of spaced end members adapted to be mounted in a spaced relationship on a vehicle and movable towards and away from each other between jounce and extended positions upon a wheel of the vehicle encountering variations in a road surface;
(b) a fluid pressure chamber formed between the end members by a flexible sleeve sealingly connected at opposite ends thereof to said end members for absorbing shock loads on the vehicle wheels;
(c) a pair of strap mounting brackets mounted on one of the end members and a single strap mounting bracket mounted on the other of said end members; and
(d) a continuous strap of flexible high strength, water resistant material having a rating of 20,000 psi operatively connected to and extending between the end members within the fluid pressure chamber to limit the movement of said end members away from each other, said strap having an intermediate portion looped about the said one mounting bracket and forms a pair of looped ends opposite of said one mounting bracket with each of the said pair of mounting brackets engaging a respective one of the formed looped ends for mounting said strap on the end members.

7. The airspring construction defined in claim 6 in which the strap is formed of nylon.

* * * * *